June 29, 1948.  D. E. KUSKA  2,444,300
GUN SUPPORT AND FAIRING
Filed April 4, 1945  2 Sheets-Sheet 1
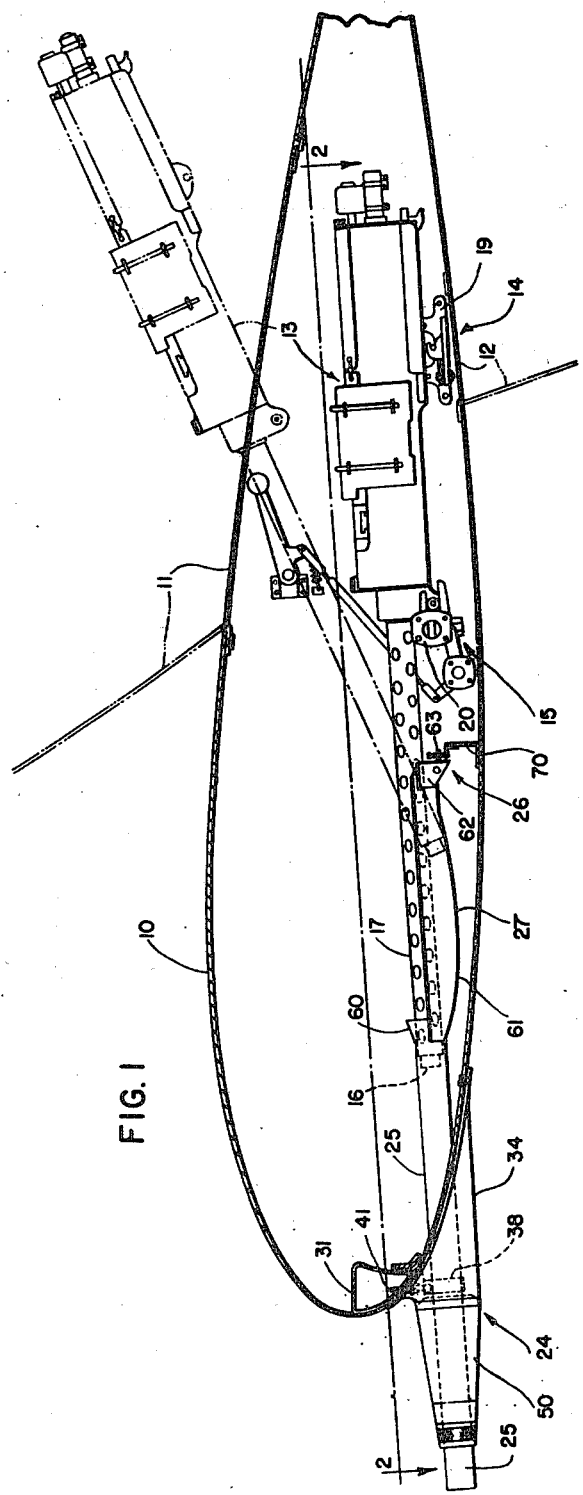
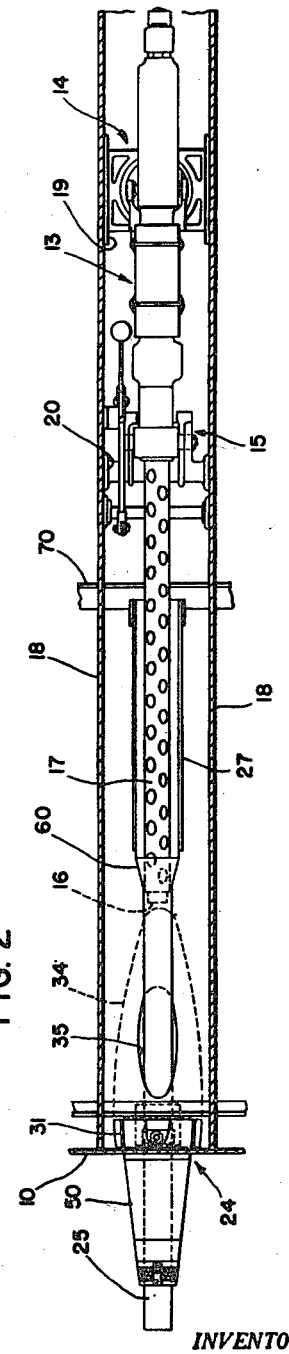
INVENTOR.
DONALD E. KUSKA
BY *George F. Goodyear*
ATTORNEY

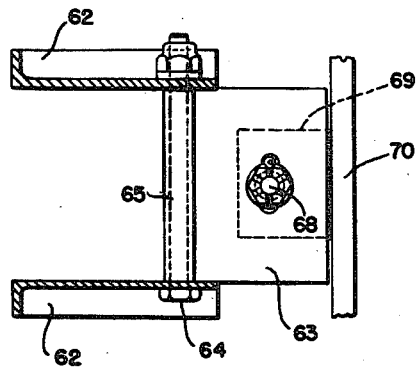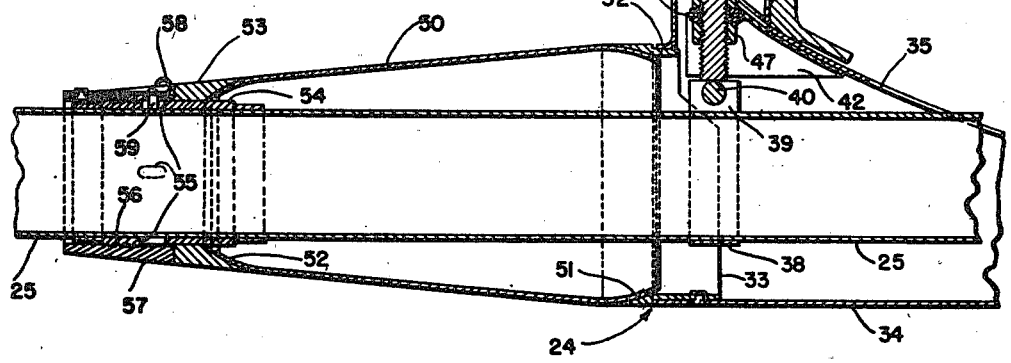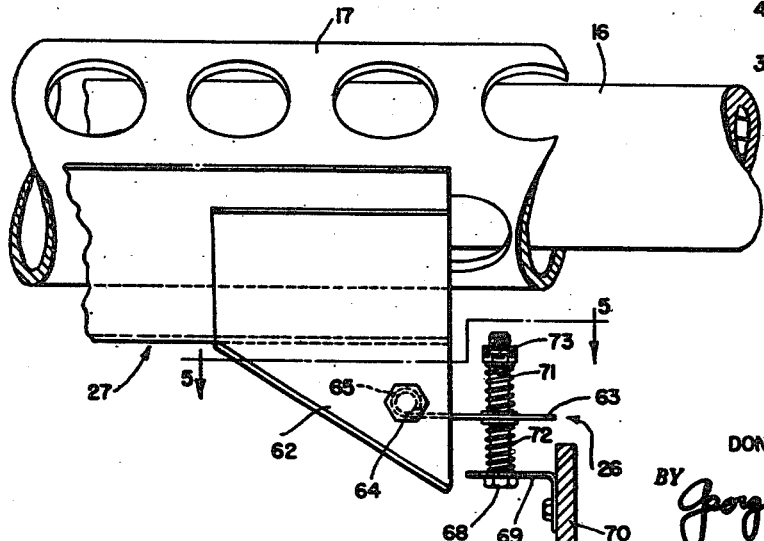

Patented June 29, 1948

2,444,300

UNITED STATES PATENT OFFICE 2,444,300

GUN SUPPORT AND FAIRING

Donald E. Kuska, Columbus, Ohio, assignor to Curtiss-Wright Corporation, a corporation of Delaware Application April 4, 1945, Serial No. 586,541

9 Claims. (Cl. 89—37.5)

The present invention relates in general to aircraft gun installations and more particularly to improvements in and concerning the blast tube mounting arrangements for such gun installations.

In military aircraft armament installations it is the usual practice to mount certain of the guns in fixed positions in the wings, at points in or on the fuselage, or in the cowling or nacelle structure which embraces the power plant. It is important these guns be mounted in such a manner that the projectile propellant gases can be expanded into the atmosphere outside the aircraft. The usual means for accomplishing this comprises a conduit or "blast tube" fitted over the gun muzzle and directed through the surface of the aircraft in line of fire.

Generally, surface openings through which blast tubes extend are undesirable as the same tend to increase drag and also expose interior structure to the incoming air especially when the opening is directed forwardly. However, some opening is necessary in order to allow gun adjustment and sighting.

Accordingly, it is an object hereof to provide an improved adjustable and streamlined blast tube fairing and mounting means for use in connection with aircraft gun installations.

It is also an object of this invention to utilize the gun blast tube as a part of the fairing and surface closure structure thereby simplifying and decreasing weight.

A further object of the invention resides in the construction and arrangement of a blast tube and supporting means whereby the gun may be quickly and easily adjusted, sighted or removed entirely.

In carrying out the foregoing object it is another object hereof to utilize a part of the blast tube supporting means as a guide for the gun muzzle when mounting or demounting the gun and to provide resilient or elastic means therefor in order to arrest or reduce vibration effects and for other reasons.

Further objects and attendant advantages of this invention will be noted in the detailed discussion of one form hereof, the same being disclosed in the accompanying drawing, in which:

Figure 1 is a longitudinal elevational view partly in section of a gun and blast tube fairing installation for fixed mounting in an aircraft body such as the airfoil, Figure 2 is a partial sectional top plan view of the gun installation shown along line 2—2 of the preceding view, the view being limited to the zone of the airfoil occupied by the gun, Figure 3 is an enlarged but fragmentary sectional elevational view of the fairing means and support for the projecting or exterior portion of the gun blast tube, Figure 4 is also an enlarged and fragmentary elevational view of the gun barrel guide and interior resilient or elastic support for the guide, Figure 5 is a detailed view of the interior support as seen along line 5—5 of Figure 4, and Fig. 6 is a detail sectional view of means for connecting a blast tube engaging clamp to a supporting stem.

The present invention is particularly concerned with the construction and arrangement of a gun blast tube mounting and fairing means as well as means adapted to guide the gun barrel into and out of fairing position with respect to the blast tube. However, the means for mounting the gun as disclosed herein is more fully disclosed in a co-pending application for patent filed in the name of Sheldon M. Miller on April 4, 1945, and bearing Serial No. 586,507.

Referring now to Figures 1 and 2, the gun and blast tube installation is illustrated as being carried by an airfoil structure 10 in which an access door 11 has been provided in its upper surface for gun removal purposes and a second door 12 has been provided in the lower surface for access to the training means for adjusting the vertical and lateral position thereof when sighting the same.

The gun 13 is suitably mounted at its rearward end on adjustable means 14 and at a more forward point by other means 15. The mounts 14 and 15 are covered in great detail in the co-pending application for patent above noted and hence will not be described here. The gun barrel 16 is suitably jacketed by the perforated tubular member 17 in the usual manner as is well understood.

In the present arrangement the gun is installed between rib elements 18 and supported at 14 and 15, the latter being provided with structural connection extending to each of these ribs as at 19 and 20, respectively.

The important features of the present arrangement comprise an external support and fairing assembly 24 for the gun blast tube 25 and an internal elastically or resiliently mounted support assembly 26 for the rearward end of the blast tube. This internal support also includes a guiding means 27 whereby the mounting and removal of the gun 13 may be facilitated as indicated by the phantom outline of the gun in Figure 1 where the same is being maneuvered through the access door 11 in the upper surface of the airfoil 10.

Referring now to Figure 3 the details of the external support and fairing assembly may be seen to better advantage. As shown, the airfoil 10 is suitably provided with a beam or strength member 30 for stiffening the leading edge since the latter has been modified, with respect to the zone of the blast tube fairing, by the addition of an internal bracket element 31 and an external and depending collar means 32 which provides a fixed support for the mounting of a socket element 33 which has its inner, forwardly facing surface machined or formed to a spherical contour as shown. This depending collar 32 is also formed with a substantial rearwardly extending body portion 34 which is formed and adapted to act as a closure and fairing member surrounding an aperture 35 in the lower surface of the leading edge of the airfoil.

The blast tube 25 projects forwardly of the leading edge of the airfoil 10 through the aperture 35 and normally lies in approximately concentric relation with the collar 32 and socket member 33 fixed in the collar. When the gun is sighted or trained for the desired angle of fire it may be that the blast tube will assume a position slightly eccentric to the collar circle and for supporting the same in this adjusted or eccentric position there is provided an adjustable clamp element 38 which encircles the blast tube as shown. The clamp lugs 39 are tightened by a clamp bolt 40. The clamp 38 is mounted, as for example by means of a block 38' as shown in Fig. 6, on a threaded stem 41 which extends upwardly through a bracket or clip 42 and also through the leading edge of the airfoil to a point beneath the member 31. The clip 42 has a perforated flange 45 against which upper and lower adjusting nuts 46 and 47 respectively are adapted to bear when the stem 41 is properly adjusted.

When the blast tube has been adjusted as desired the annular opening between it and the socket element 33 is closed by a conic sleeve 50 which is formed at its rearward and forward end zones with part spherical surfaces 51 and 52 respectively. The surface 51 seats in the cooperating surface of the socket 33 such that the sleeve is permitted to swivel or move in a circular orbit, thus simulating a ball and socket type connection.

The forward end 52 of the conic fairing sleeve is also swivelly mounted in a second socket element 53, the latter being mounted on a bearing sleeve 54 rigidly secured to the blast tube. It will be seen that the universally movable part-spherical connections of the member 50 at the ends thereof to the fairing member and the blast tube constitute swivel connections which enable the blast tube to be moved in radial directions as may be required by adjustment of the gun to the desired line of fire. The bearing sleeve is provided with a series of slots 55 spaced around its circumference and is also threaded at a zone forwardly of these slots, as at 56. A holding collar 57 is then threaded over the bearing sleeve and into axial abutment with the socket 53 whereby the conic sleeve can be held in its adjusted position to fair the blast tube into the fairing and closure body 34. The holding collar is provided with a resilient element 58 carrying a lock pin 59 adapted to fit into one of the slots 55 for the purpose of preventing displacement of the collar due to vibration or other causes.

It can thus be seen that the conic sleeve 50 and its ball and socket type of mounting arrangement relative to the fixed fairing 34 and to the forward end of the blast tube will give the whole assembly sufficient flexibility to accommodate whatever eccentric or off-center adjustment is required of the blast tube when sighting the gun. The blast tube is also faired into the airfoil with a minimum of difficulty and the fairing structure maintains smooth exterior surfaces at all positions of adjustment. Whatever the blast tube position it is now obvious that the universal swiveling action of the fairing means 50 will maintain continuity with the fixed fairing body 34.

Turning now to the internal elastic support means for the inward end of the blast tube 25 it can be seen in Figures 1, 2 and 4 that the gun muzzle is directed into the flared end 60 of the tube by means of a guide 27 which is a channel member formed with a concave bottom surface 61. The curvature of the surface 61 is highly desirable as it provides a desirable path of travel for the gun muzzle thus aiding the quick manipulation of the gun during removal or replacement. The forward end of the guide 27 is rigidly secured to the blast tube while the rearward end is elastically or resiliently supported for movement in a direction laterally of the gun.

This rear support 26 (Figures 4 and 5) comprises a pair of flanged side bracket elements 62 between which has been mounted a plate 63 as by means of a bolt 64 received in the brackets and passing through a body portion 65 of the plate 63. This plate is permitted swinging movement about the bolt axis but at the same time restricts lateral movement of the guide 27. The plate is apertured to receive a guide pin 68, the axis of which is substantially normal to the bolt 64, and this pin is mounted in a bracket 69 carried by a suitable structural member 70 of the airfoil. The connection between the plate and the guide pin comprises a pair of resilient elements 71 and 72 positioned at the upper and lower sides of the plate. The element 72 is retained between the bracket 69 and the plate 63 while the element 71 is secured between the plate 63 and a nut 73 threaded on the pin 68 as shown in Figure 4. The assembly of resilient elements, guide pin and swingable plate 63 co-acts to form an elastic means for supporting the guide member 27 and hence the blast tube 25. The degree of elasticity may be regulated by adjusting the nut 73 up or down on the guide pin.

The foregoing description has covered a presently preferred arrangement of exterior and interior support means for a gun and gun blast tube assembly for use in an airfoil body armament installation. A number of modifications can be made herein but it should be understood that all such modifications may be carried out within the spirit and intended scope of the claims annexed hereto.

What is claimed is:

1. In an aircraft having an adjustable gun installation in which the gun is directed to fire through a port formed in the aircraft, the combination therewith of a blast tube for the gun, support means for said blast tube external to and on the aircraft, and support means for said blast tube internal of the aircraft, said external support means including a fairing over said port, said fairing at the end thereof adjacent the port being connected for universal angular movement with the aircraft and at the opposite end thereof being connected for universal angular movement with the blast tube, the universal movement of the fairing providing for adjustment of the blast tube in radial directions within said port.

2. In an aircraft having a removable gun installation in which the gun is directed to shoot through a port formed in the aircraft, the combination therewith of a blast tube for the gun, support means for said blast tube external to and on the aircraft, and support means for said blast tube internal of the aircraft, said internal support including a guide element rigidly secured to said blast tube at its forward end and elastically secured to the aircraft at its rearward end, said guide element being engageable by the gun muzzle for directing the latter into or away from said blast tube upon assembly or removal of the gun.

3. In an aircraft having a port through which a gun is aimed and fired, the combination therewith of a blast tube for the gun projecting forwardly from the gun muzzle and through the port, a support for said blast tube swiveled to the blast tube and also to the aircraft for allowing movement of the blast tube in a direction radial thereto, said swiveling support being positioned on the aircraft to form a closure for the port therein, and an elastic support for said blast tube, said elastic support being located internally of the aircraft and rearwardly of the gun muzzle.

4. In an aircraft having a demountable gun, a blast tube installation in which the aircraft is provided with a port to receive the blast tube, the combination therewith of a blast tube support positioned externally of and on the aircraft to act as a port closing means, guiding means secured to the inner end of the blast tube for directing the gun muzzle into and out of the blast tube during mounting and demounting of the gun, and elastic means for supporting said guiding means on the aircraft.

5. In an aircraft having a demountable gun and a blast tube, the aircraft being provided with a port to receive the blast tube, the combination therewith of a blast tube support positioned externally of and on the aircraft to act as a port closing means, said externally positioned blast tube support having a swiveling connection with said blast tube and with the aircraft, guiding means secured to the inner end of the blast tube for directing the gun muzzle into and out of the blast tube during mounting and demounting of the gun, and elastic means for supporting said guiding means on the aircraft.

6. In an airfoil body gun installation in which the airfoil is formed with a port near its leading edge, the combination therewith of an adjustable gun blast tube projecting outwardly of the port, means for supporting the inner end of said blast tube within the airfoil, and adjustable means carried outwardly of and on the airfoil for supporting the outward end of said blast tube and for closing the port near the leading edge thereof, said last mentioned means including an element which is faired into the leading edge of the airfoil over the port formed therein, and said last mentioned means also including an element which is connected to said blast tube and to said faired element for swiveling movement with respect to each to enable movement of the tube in a direction radial thereto.

7. In an airfoil body gun installation in which the airfoil is formed with a port near its leading edge, the combination therewith of an adjustable gun blast tube projecting outwardly of the port, elastic means for supporting the inner end of said blast tube within the airfoil, and adjustable means carried outwardly of and on the airfoil for supporting the outward end of said blast tube and for closing the port near the leading edge thereof, said last mentioned means including an element which is faired into the leading edge of the airfoil over the port formed therein, and said last mentioned means also including an element which is connected to said blast tube and to said faired element for swiveling movement with respect to each to enable movement of the tube in a direction radial thereto.

8. In an aircraft having a blast tube installation for a demountable gun, the aircraft being provided with a port to receive the blast tube, the combination therewith of a blast tube support positioned externally of and on the aircraft to act also as a port closing means, guide means secured to the inner end of the blast tube for directing the gun muzzle into and out of the blast tube during mounting and demounting thereof, and elastic means adapted to support said guide means on the aircraft, said elastic means including a swingable element carried by said guide means, resilient means bearing on said swingable element, and means on said aircraft for supporting said resilient means.

9. In an aircraft having an adjustable gun installation in which the gun is directed to shoot through a port formed in the aircraft, the combination therewith of a blast tube for the gun extending through and adjustable in radial directions relative to said port, support means for the blast tube external of and on the aircraft, said support means including fairing means secured to the aircraft over said port, and a tubular member extending around said blast tube, said tubular member having at one end thereof a universally adjustable part-spherical connection with the fairing means and at the opposite end thereof a universally adjustable part-spherical connection with the blast tube.

DONALD E. KUSKA.

REFERENCES CITED

The following references are of record in the file of this patent:

UNITED STATES PATENTS

| Number | Name | Date |
|---|---|---|
| 2,271,700 | Martin | Feb. 3, 1942 |
| 2,382,325 | Martin | Aug. 14, 1945 |